(12) United States Patent
Park

(10) Patent No.: US 6,408,188 B1
(45) Date of Patent: Jun. 18, 2002

(54) METHOD OF SENDING A SHORT MESSAGE IN A DIGITAL MOBILE PHONE

(75) Inventor: Dong-Hee Park, Kyongsangbuk-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/370,055

(22) Filed: Aug. 6, 1999

(30) Foreign Application Priority Data

Aug. 6, 1998 (KR) ............................................. 98-32035

(51) Int. Cl.⁷ ................................................. H04Q 7/20
(52) U.S. Cl. ....................... 455/466; 455/422; 455/414; 455/13.4; 340/7.21
(58) Field of Search ............................... 340/825, 7.21; 455/13.4, 422, 466, 414

(56) References Cited

U.S. PATENT DOCUMENTS

| | | | | |
|---|---|---|---|---|
| 5,450,612 A | * | 9/1995 | Chanroo et al. | 455/38.1 |
| 5,541,976 A | * | 7/1996 | Ghister | 379/57 |
| 5,604,492 A | * | 2/1997 | Abdul-Halim | 340/825.44 |
| 5,806,000 A | * | 9/1998 | Vo et al. | 455/466 |
| 5,878,351 A | * | 3/1999 | Alanara et al. | 455/466 |
| 5,987,323 A | * | 11/1999 | Huotari | 455/433 |
| 6,018,657 A | * | 1/2000 | Kennedy, III et al. | 455/426 |
| 6,055,442 A | * | 4/2000 | Dietrich | 455/558 |
| 6,125,281 A | * | 9/2000 | Wells et al. | 455/466 |
| 6,161,020 A | * | 12/2000 | Kim | 455/466 |
| 6,216,008 B1 | * | 4/2001 | Lee | 455/466 |

* cited by examiner

*Primary Examiner*—Dwayne Bost
*Assistant Examiner*—Karl Peterson
(74) *Attorney, Agent, or Firm*—Dilworth & Barrese, LLP

(57) ABSTRACT

A method of sending a short message to a receiver at a predetermined time in a digital mobile phone, which includes the steps of changing the operational mode of the mobile phone from a short message preparation mode to a multiply addressed sending mode, sequentially registering a series of phone numbers designating the receivers to receive the short message, sequentially sending the short message to the receivers according to the order of the registered phone numbers when a send signal is inputted, and setting the mobile phone to a standby mode when the short message has been sent to each of the receivers.

5 Claims, 5 Drawing Sheets

METHOD OF SENDING A SHORT MESSAGE IN A DIGITAL MOBILE PHONE

BACKGROUND OF THE INVENTION

1. Field of the Invention

The present invention relates generally to a digital mobile phone and in particular, to a method of sending a short message in a digital mobile phone.

2. Description of the Related Art

Digital mobile phones are commonly provided with a short message service (SMS), which enables the user to send a short message constructed as a sequence of characters to another subscriber. The short message is displayed by the receiver as visual information composed of alphanumeric characters representing the sender's message and telephone number. The conventional SMS mobile phone may only send a short character message to a single subscriber. That is, it cannot simultaneously send the prepared message to several receivers, i.e., by a single key input at a predetermined time. Sending a prepared short message to multiple addressed receivers at a predetermined time may be additionally provided only by employing the system of the service provider.

SUMMARY OF THE INVENTION

It is therefore an object of the present invention to provide a method of sending a prepared short message to several receivers via a single key input at a predetermined time in a digital mobile phone.

According to an aspect of the present invention, a method of sending a short message to a plurality of receivers at a predetermined time in a digital mobile phone, includes the steps of: changing the operational mode of the mobile phone from a short message preparation mode to a scheduled sending mode, registering the predetermined time while in the scheduled sending mode, setting a scheduled sending function after registering the short message including the user's identifying information, and sending the registered message when the present time detected is equal to or exceeds the predetermined time.

According to another aspect of the present invention, a method of sending a short message to a plurality of receivers at a predetermined time in a digital mobile phone, includes the steps of: changing the operational mode of the mobile phone from a short message preparation mode to a multiply addressed sending mode, sequentially registering a series of phone numbers corresponding to the plurality of receivers, sequentially sending the short message to the plurality of receivers associated with the registered phone numbers by reading the series of phone numbers when a send signal is inputted, and setting the mobile phone to a standby state when the short message has been sent to each of said plurality of receivers.

DETAILED DESCRIPTION OF THE PREFERRED EMBODIMENT

Figure 1:
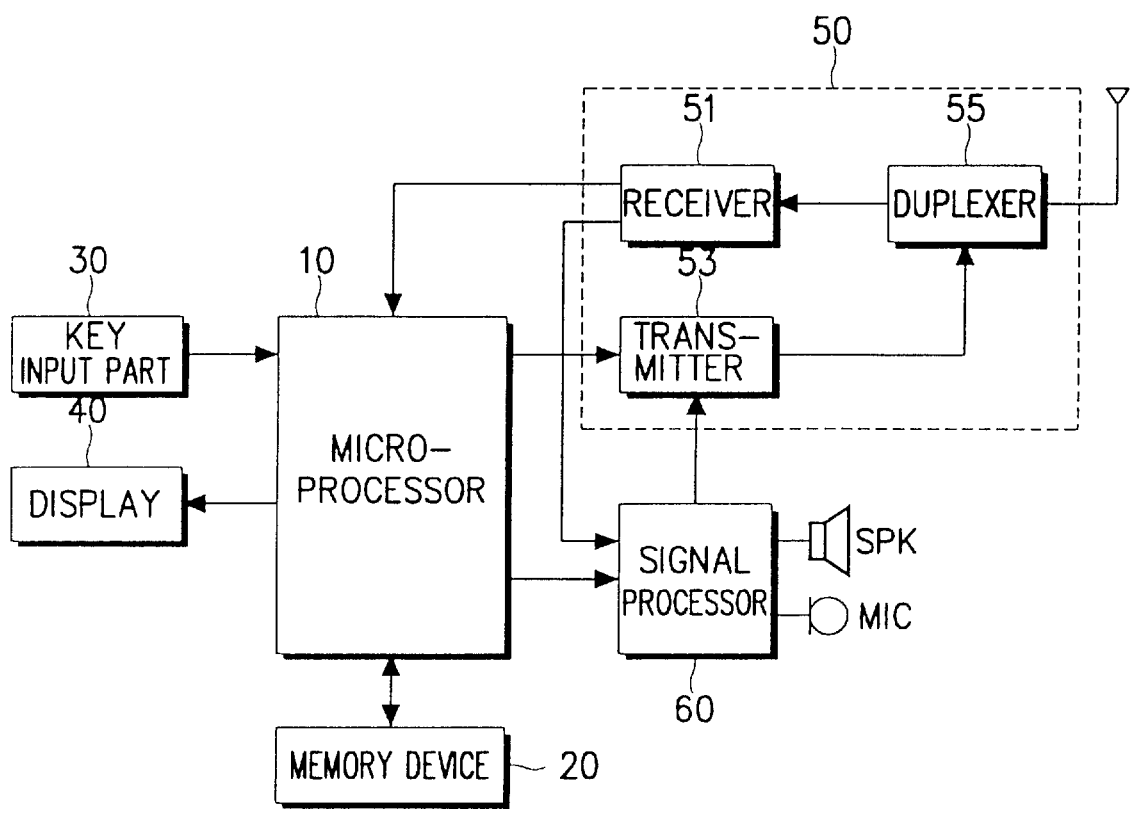
FIG. 1 is a block diagram of a digital mobile phone with a character recognition means, which may provide a short message service (SMS) according to an embodiment of the present invention.

FIG. 1 generally depicts, in block diagram form, the construction of a digital mobile phone in accordance with the invention. Referring to FIG. 1, the digital mobile phone is generally controlled by a one-chip microprocessor 10 according to a control program. A memory device 20 is operatively coupled to the microprocessor 10, and includes ROM for storing the operational program required to control the phone, and RAM for temporarily storing the data generated during execution of the operational program. The RAM typically serves as a buffer. Also included in the memory device 20 is an electrically erasable and programmable ROM (EEPROM) to store optional data for the operational program. In the present embodiment, the EEPROM includes a subscriber phone number storage area for storing the phone numbers of the subscribers, and a scheduled time storage area for storing scheduled times.

Key input part 30 includes a plurality of alphanumeric keys, functional keys, and a message key for entering the short message service (SMS) mode. The key input part 30 generates key data applied to the microprocessor 10, which controls a display 40 to display the key data in addition to information concerning the operational state of the digital mobile phone in icons and characters. A signal processor 60 converts the sounds inputted through a microphone MIC into digital signals and also converts digital signals into corresponding analog signals to be outputted through a speaker SPK. A radio frequency part (hereinafter referred to as RF part) 50 includes a duplexer 55 for separating the radio signals transmitted and received through an antenna ANT, a receiver 51 for demodulating the radio signals received through the antenna ANT into the base band signals applied to the signal processor 60, and a transmitter 53 for modulating the signals from the signal processor 60 into the radio signals. The short message is modulated by the transmitter into the radio signal.

Figure 2A:
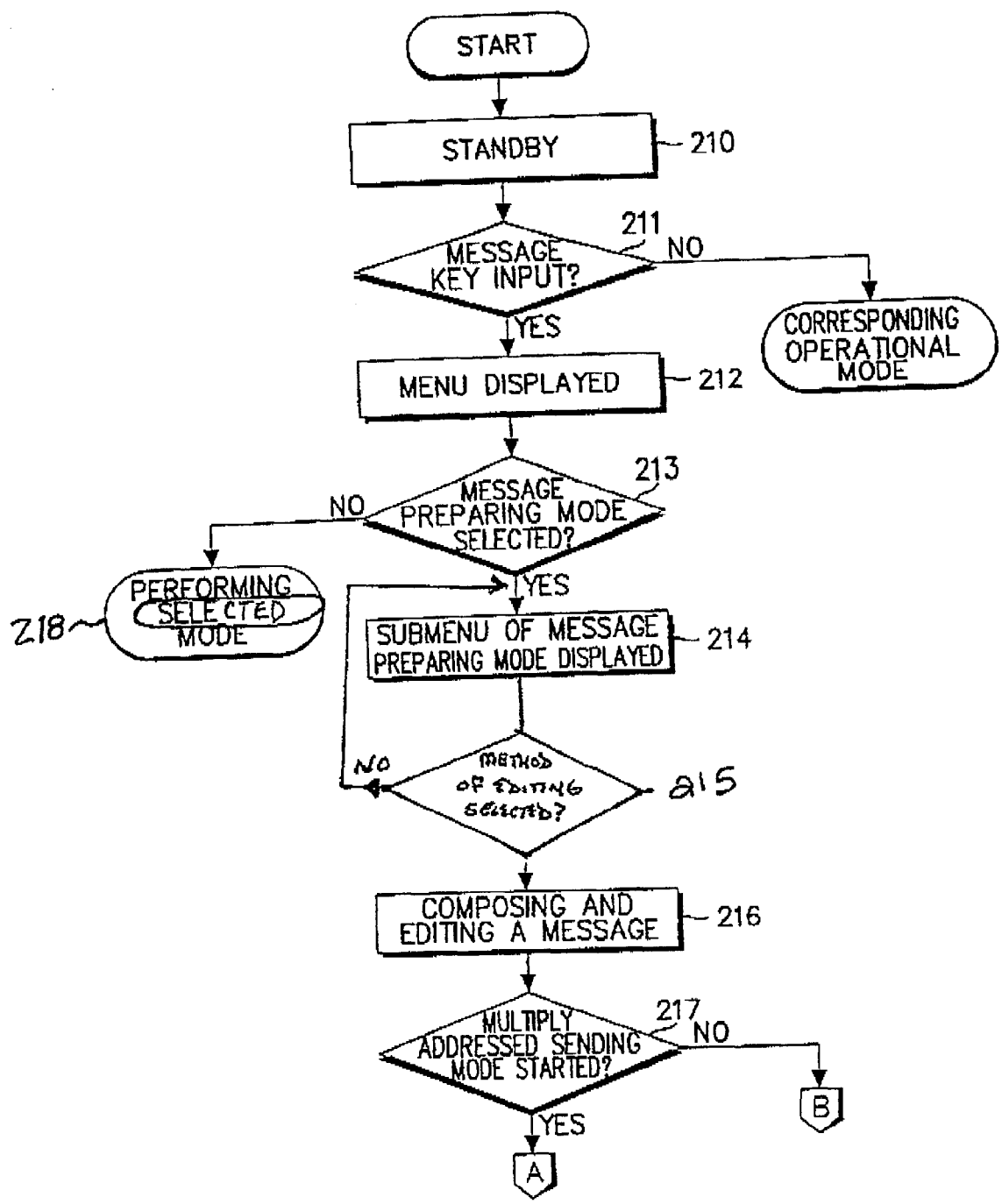
FIG. 2A is a flowchart illustrating a method for preparing a message upon entering a short message preparation mode according to an embodiment of the present invention.
Figure 2B:
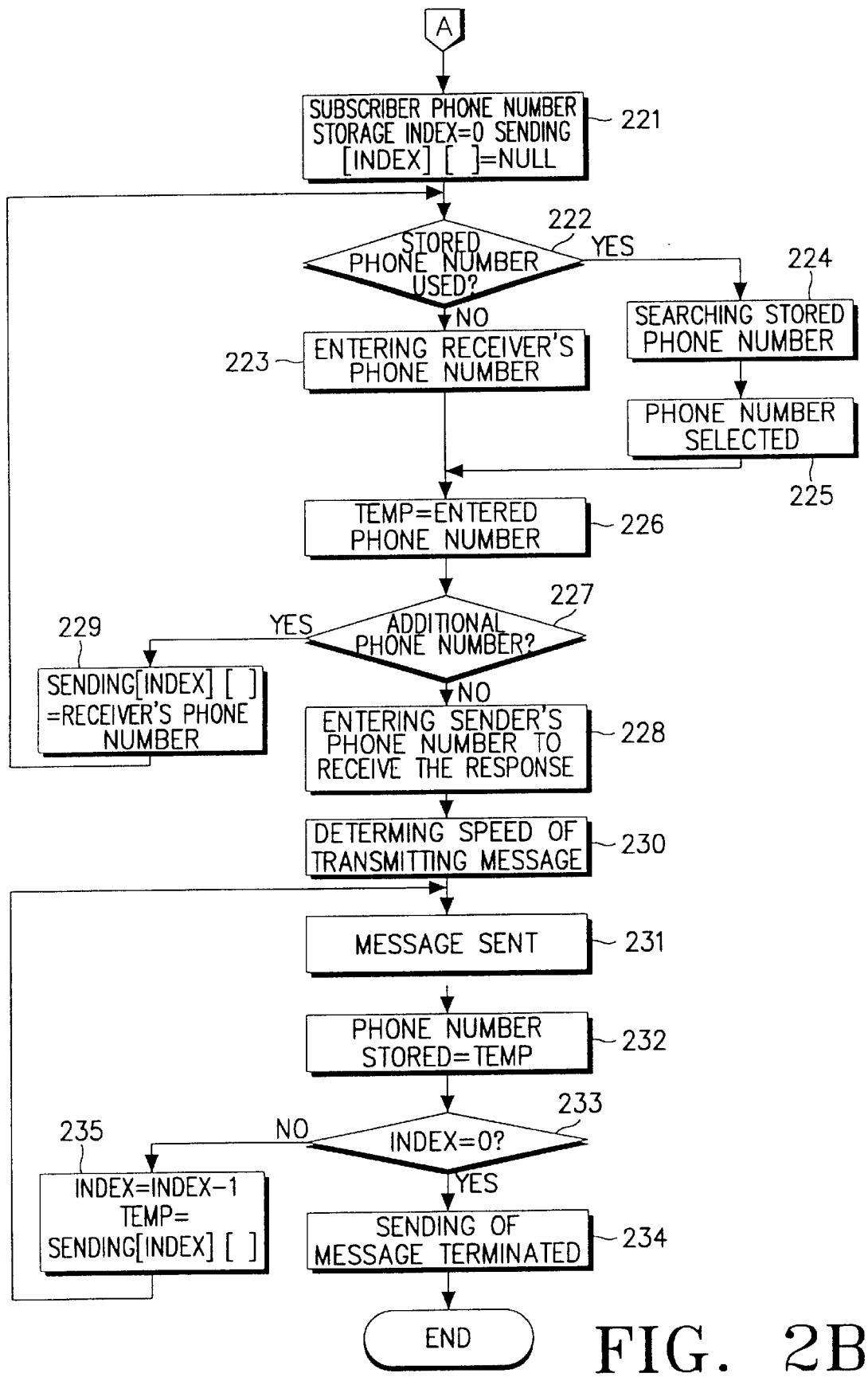
FIG. 2B is a flowchart illustrating how a multiply addressed short message is transmitted according to an embodiment of the present invention.
Figure 2C:
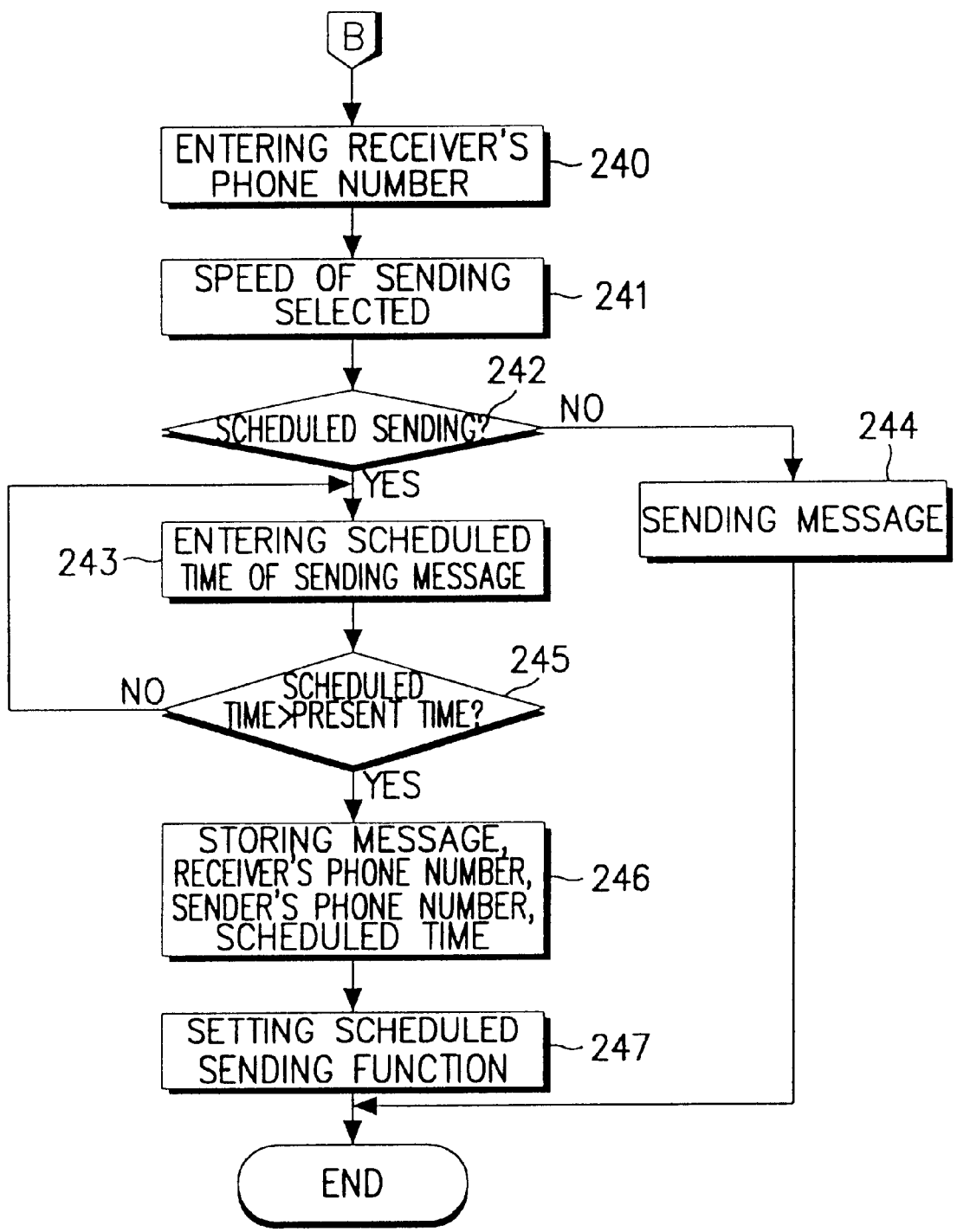
FIG. 2C is a flowchart illustrating a method for registering scheduled times to send the short message according to an embodiment of the present invention.
Figure 2D:
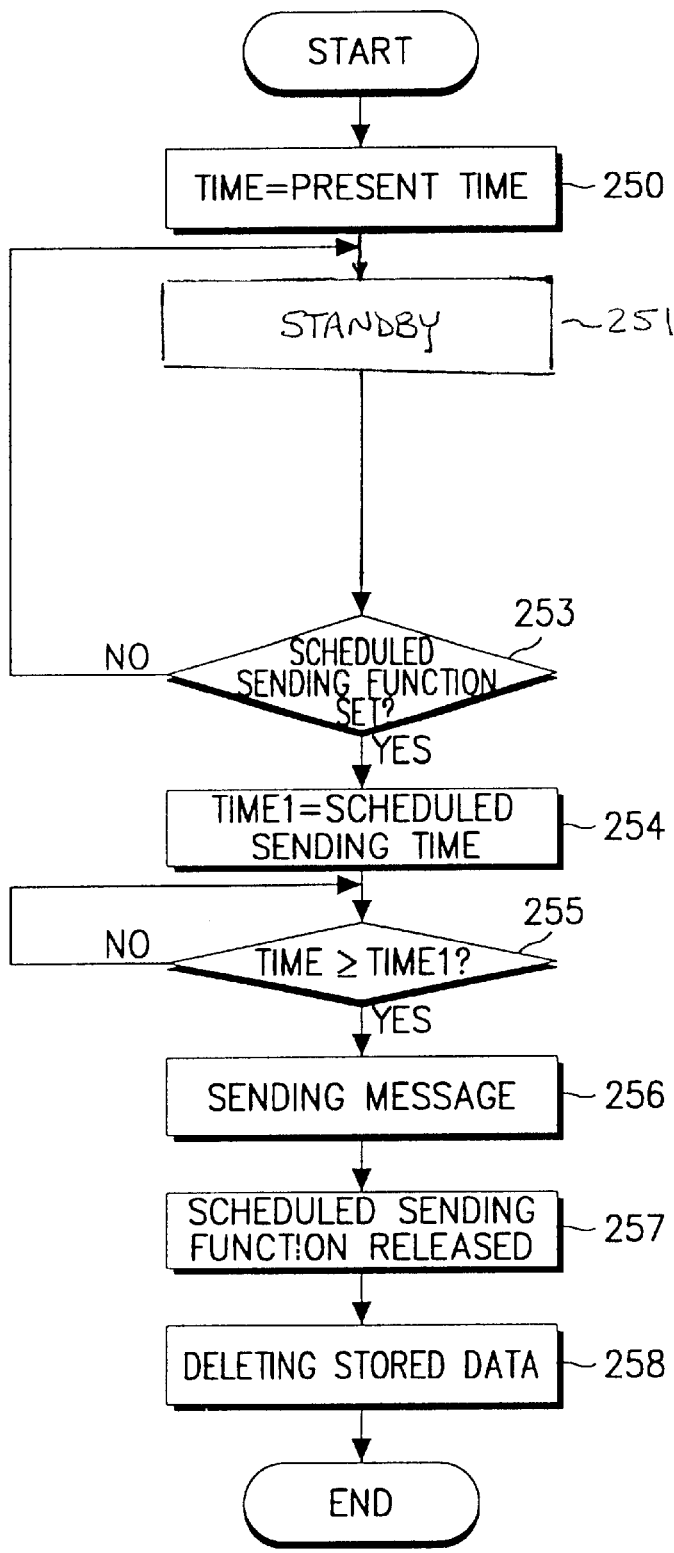
FIG. 2D is a flowchart illustrating a method for sending the short message at the scheduled times according to an embodiment of the present invention.

FIG. 2A is a flow diagram illustrating a method for preparing a short message upon entering the short message preparation mode. FIG. 2B is a flow diagram illustrating how a multiply addressed short message is transmitted. FIG. 2C is a flowchart illustrating the scheduled times to send the short message. FIG. 2D is a flowchart illustrating sending the short message at the scheduled times. Each figure will be described in greater detail below.

Referring initially to FIG. 2A, when the digital mobile phone is in a standby state in step 210, upon depressing the message key of the key input part 30, in step 211, the short message service (SMS) menu is displayed in step 212. The SMS menu displays the functional modes which include, for example, a message preparation mode and a message confirmation mode. Upon determining that the message preparation mode has been selected from the SMS menu in step 213, a submenu of the message preparation mode is displayed in step 214. Otherwise, if a mode other than the message preparation mode is selected at decision step 213, a branch is taken to step 218 for performing one of the other modes displayed in the SMS menu, for example, the message confirmation mode. The submenu of the message preparation mode contains choices for editing, retrieving and composing a sentence. Step 215 is a decision step for determining if a method of editing has been selected by the user. If not, the process returns to step 214, the display step. Otherwise, the process continues at step 216 describing methods for composing and editing a sentence. Then, it is determined whether a key input has been received to enter the multiply addressed sending mode, described below with reference to FIG. 2D.

The method for transmitting a short message in a multiply addressed sending mode will now be described in connection with FIG. 2B. The microprocessor 10 initializes the index of the subscriber phone number storage in step 221 (i.e., the index counter is initialized to zero). This step is performed in preparation for making a new index of the subscribers' phone numbers newly inputted after deleting a previously set index of the subscribers' phone numbers. Messages are sent in accordance with the order of the current index. For each message sent, a previously set phone number to which the message has been sent is deleted from the new sending index of the subscriber phone number storage, so that a new phone number may be stored for a next sending operation. In step 222, it is determined whether a previously stored phone number is to be used for the sending of the message. If so, a search mode is started to search the stored phone numbers in step 224. The retrieved phone number is stored in step 225 in a sending buffer "Temp" in step 226. However, if it is determined in step 222 that the phone number previously stored is not to be used, the user may input the receiver's phone number in step 223. Likewise, the receiver's phone number inputted by the user is stored into the sending buffer "Temp" in step 226. If the user requires the input of an additional phone number in step 227, in step 229, the index of the subscriber phone number storage is increased by one (presently initialized to NULL) after storing the receiver's phone number into the sending index of the subscriber phone number storage. Then, the process returns to step 222 to store the additional phone number. However, if there is no demand for an additional phone number in step 227, the process proceeds to step 228 to input the sender's phone number who is to receive the SMS response message in step 228.

In step 230, the message transmission rate is determined according to whether the message should be sent as speed mail, urgent mail or ordinary mail. The message is then sent in step 231. The receiver's phone number is retrieved from the buffer "Temp" and stored into a given region of the EEPROM in step 232, so that it may be reused later, for example, sending another message to the same receiver. In step 233, it is determined whether the index of the subscriber phone number storage is zero. A zero index means that the message has been sent to all of the phone numbers stored. In step 233, if it is determined that the index is zero, the sending of the message is terminated in step 234. However, if the index of the subscriber phone number storage is not zero, the index is decreased by one in step 235 to return to step 231 to continue the sending of the message to the phone number associated with the decreased index. Namely, the buffer "Temp" is written with the phone number of the decreased index.

FIG. 2C is a flowchart illustrating the method for sending the SMS message. Referring to FIG. 2C, if the key input represents the ordinary sending mode instead of the multiply addressed sending mode as described in step 217 of FIG. 2A, the receiver's phone number is entered in step 240. Thereafter, the message transmission rate is specified in step 241. If the scheduled sending mode is not selected in step 242, the message is sent in accordance with the conventional sending method, in step 244. However, if the scheduled sending mode is selected in step 242, the time scheduled to send the message is entered in step 243. If the scheduled time entered is determined to be a past time in step 245, the process returns to step 243. Otherwise, if the scheduled time entered is determined to be a future time in step 245, there are stored in step 246 the prepared message, receiver's phone number, sender's phone number and the scheduled time. In step 247, the scheduled sending function is set to be further described with reference to FIG. 2D.

With reference to FIG. 2D, the reference time is first set to the present time in step 250. In step 251, the microprocessor 10 enters the standby mode. If, in decision step 253, it is determined that the scheduled sending function has been set, a reference time Time1 is set to the scheduled sending time in step 254. If it is determined in step 255 that the present time is equal to or greater than the reference time, the message is sent in step 256. Otherwise, the method remains in loop 255 until the present time is equal to or greater than the reference time. Then, the scheduled sending function is released in step 257, deleting all the stored data in step 258. Though not described in FIG. 2D, step 256 may be repeated when the sending of the message fails.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of sending a short message to a plurality of receivers at a predetermined time utilizing a single send command in a digital mobile phone, comprising the steps of:

changing the operational mode of said mobile phone from a short message preparation mode to a scheduled sending mode;

registering said predetermined time while in said scheduled sending mode;

registering said short message including a user's identifying information while in said scheduled sending mode;

setting a scheduled sending function; and transmitting the registered short message when the present time is equal to or exceeds said predetermined time.

2. A method as defined in claim 1, further including the steps of terminating the scheduled sending function after completing the sending of said registered short message, and deleting the user's identifying information.

3. A method as defined in claim 1, wherein the step of registering said predetermined time further includes the step of returning to said scheduled sending mode after generating an error message when said predetermined time represents a past time.

4. A method of sending a short message to two or more receivers at a predetermined time in a digital mobile phone, comprising the steps of:

changing the operational mode of said mobile phone from a short message preparation mode to a multiple address sending mode;

sequentially registering a series of phone numbers corresponding to the two or more receivers;

sequentially sending said short message to the two or more receivers associated with the registered phone numbers by reading said phone numbers when a send signal is inputted; and setting said mobile phone to a standby mode when the short message has been sent to each of the two or more receivers.

5. A method as defined in claim 4, wherein the step of sequentially registering said series of phone numbers includes the steps of:

sequentially registering the phone numbers retrieved from a subscriber phone number storage;

setting a scheduled sending mode;

registering a predetermined time in said scheduled sending mode;

setting a scheduled sending function after registering said short message including a users identifying information; and sending the registered message when the present time is equal to or more current than said predetermined time.

* * * * *